US012120616B2

United States Patent
Murayama et al.

(10) Patent No.: US 12,120,616 B2
(45) Date of Patent: Oct. 15, 2024

(54) LOCAL WIRELESS COMMUNICATION SYSTEM, RADIO FIELD INTENSITY CONTROL METHOD, CONTROL DEVICE, AND PROGRAM

(71) Applicant: NIPPON TELEGRAPH AND TELEPHONE CORPORATION, Tokyo (JP)

(72) Inventors: Daisuke Murayama, Musashino (JP); Koichi Ishihara, Musashino (JP); Kenichi Kawamura, Musashino (JP); Takatsune Moriyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 133 days.

(21) Appl. No.: 17/908,310

(22) PCT Filed: Mar. 2, 2020

(86) PCT No.: PCT/JP2020/008703
§ 371 (c)(1),
(2) Date: Aug. 31, 2022

(87) PCT Pub. No.: WO2021/176521
PCT Pub. Date: Sep. 10, 2021

(65) Prior Publication Data
US 2023/0097069 A1 Mar. 30, 2023

(51) Int. Cl.
*H04W 24/10* (2009.01)
*H04W 52/24* (2009.01)

(52) U.S. Cl.
CPC ......... *H04W 52/245* (2013.01); *H04W 24/10* (2013.01)

(58) Field of Classification Search
CPC .... H04W 52/245; H04W 24/10; H04W 52/24
See application file for complete search history.

(56) References Cited

U.S. PATENT DOCUMENTS

| | | | |
|---|---|---|---|
| 7,958,041 B2 * | 6/2011 | Stanforth | G06Q 10/06395 705/37 |
| 8,125,917 B2 * | 2/2012 | Bevan | H04W 24/02 370/252 |

(Continued)

FOREIGN PATENT DOCUMENTS

| | | |
|---|---|---|
| JP | 2010521105 A | 6/2010 |
| JP | 2012505581 A | 3/2012 |

(Continued)

OTHER PUBLICATIONS

Kazuaki Takeda et al., Examination status of physical layer element technology and high frequency band utilization in 5G, Ntt DoComo Technical Journal, vol. 25, No. 3, 2017, pp. 23-32.

*Primary Examiner* — Hai V Nguyen

(57) ABSTRACT

An embodiment of the present invention is a local wireless communication system that emits a radio wave in a licensed band to form a wireless communication environment in a predetermined area. The system includes a base station configured to emit a radio wave, a plurality of sensors disposed along an edge of the area, and a control apparatus. The sensors each measure a radio field intensity of the radio wave emitted from the base station, and feed the radio field intensity back to the control apparatus via the base station. The control apparatus controls a transmission power of the radio wave from the base station to control the fed radio field intensity.

6 Claims, 6 Drawing Sheets

(56) References Cited

U.S. PATENT DOCUMENTS

| | | | | |
|---|---|---|---|---|
| 8,233,433 B2* | 7/2012 | Kalhan | .................. | H04W 48/12 |
| | | | | 370/328 |
| 8,989,033 B2* | 3/2015 | Song | .................... | H04L 1/0035 |
| | | | | 370/252 |
| 10,932,284 B2* | 2/2021 | Pajona | .................. | H04W 24/02 |
| 10,986,622 B2* | 4/2021 | Zhang | .................. | H04L 5/0094 |
| 11,544,782 B2* | 1/2023 | Cella | ...................... | G06Q 40/03 |
| 11,550,299 B2* | 1/2023 | Cella | .................. | G06Q 30/0206 |
| 11,599,941 B2* | 3/2023 | Cella | ...................... | G06Q 40/08 |
| 11,665,725 B2* | 5/2023 | Pajona | .................. | H04W 72/54 |
| | | | | 370/252 |
| 11,784,861 B2* | 10/2023 | Aldana | ............. | H04W 72/1215 |
| | | | | 370/336 |
| 2008/0144493 A1* | 6/2008 | Yeh | .................. | H04W 74/0816 |
| | | | | 370/230 |
| 2008/0222019 A1 | 9/2008 | Stanforth et al. | | |
| 2008/0222021 A1* | 9/2008 | Stanforth | ............. | G06Q 50/60 |
| | | | | 705/37 |
| 2008/0252518 A1* | 10/2008 | Yeshayahu | ............. | G01S 19/48 |
| | | | | 342/357.31 |
| 2008/0298275 A1* | 12/2008 | De Sousa | ............. | H04W 16/18 |
| | | | | 455/562.1 |
| 2009/0213819 A1* | 8/2009 | Kalhan | .................. | H04W 36/14 |
| | | | | 370/338 |
| 2010/0091745 A1* | 4/2010 | Bevan | .................. | H04W 24/02 |
| | | | | 370/338 |
| 2018/0007703 A1* | 1/2018 | Pajona | ................ | H04W 72/543 |
| 2020/0351128 A1* | 11/2020 | Ryu | ....................... | H04B 7/088 |
| 2021/0051502 A1* | 2/2021 | Yamada | .................. | H04B 17/309 |
| 2021/0058970 A1* | 2/2021 | Kwak | .................... | H04L 5/0064 |
| 2021/0176771 A1* | 6/2021 | Pajona | ................ | H04W 72/543 |
| 2021/0194740 A1* | 6/2021 | Aldana | ............. | H04W 72/1268 |
| 2022/0123898 A1* | 4/2022 | Shi | ......................... | H04W 52/08 |
| 2022/0191935 A1* | 6/2022 | Xiong | ................ | H04W 74/0833 |
| 2022/0368391 A1* | 11/2022 | Garcia Rodriguez | ...................... | |
| | | | | H04B 7/0617 |
| 2023/0078181 A1* | 3/2023 | Ghanbarinejad | ... | H04W 52/325 |
| | | | | 370/318 |
| 2023/0254714 A1* | 8/2023 | Murayama | ............ | H04W 24/10 |
| | | | | 370/252 |

FOREIGN PATENT DOCUMENTS

| | | | |
|---|---|---|---|
| JP | 2019054305 A | 4/2019 | |
| WO | WO-2017130967 A2 * | 8/2017 | ........... H04B 17/309 |
| WO | WO-2024039554 A1 * | 2/2024 | |

* cited by examiner

LOCAL WIRELESS COMMUNICATION SYSTEM, RADIO FIELD INTENSITY CONTROL METHOD, CONTROL DEVICE, AND PROGRAM

CROSS-REFERENCE TO RELATED APPLICATIONS

This application is a 371 U.S. National Phase of International Application No. PCT/JP2020/008703, filed on Mar. 2, 2020. The entire disclosure of the above application is incorporated herein by reference.

TECHNICAL FIELD

The present invention relates to a local wireless communication system, for example, built and operated by an owner, and a radio field intensity control method, a control apparatus, and a program used in the system.

BACKGROUND ART

A fifth-generation mobile communication system (5G) is promising as a next generation mobile communication system. The 5G has features such as an ultra-high speed, an ultra-low delay, or multiple simultaneous connections. To meet such demands, various frequency bands are exploited from a relatively low bandwidth such as an 800 MHz band, a 2 GHz band, a sub-6 GHz band, or Wi-Fi (trade name) to a high bandwidth such as a millimeter-wave band. An available bandwidth is licensed by a public agency.

A local 5G (L5G) can be said to be a local wireless communication system using a 5G technology. The L5G system is a cellular wireless system built and operated by an owner of a premise (a corporation, an autonomous body, or the like) who has a license to operate, and is provided in a limited area such as an inside of a building or a plant. Thus, it is important to prevent suffering interference from a system of another operator and to prevent causing interference to a system of another operator.

To prevent radio wave interference, simply, a sufficiently long separation distance only needs to be provided. However, it is estimated that approximately 1.75 km is required in an urban area and approximately 5 km is required in a suburban area to prevent causing interference and suffering interference in the L5G bandwidth, and there is room for improvement in view of a space utilization efficiency. As such, it has been examined that an antenna beam is controlled to actively avoid suffering interference and causing interference (see NPL 1).

CITATION LIST

Non Patent Literature

NPL 1: "Status of Investigations on Physical-layer Elemental Technologies and High-frequency-band Utilization", NTT DoCoMo Technical Journal (Vol. 25, No. 3 (October 2017)

SUMMARY OF THE INVENTION

Technical Problem

In a local wireless communication system represented by the L5G, it is necessary to prevent radio wave interference between systems. The demand is particularly strong in an urban area in which premises are close to one another. It is unfair that a system is deployed on a first-come-first-served basis, and further, for facilitating coordination among operators, technical development has been anticipated to prevent radio wave interference.

The present invention has been made focusing on the above circumstances, and is directed to providing a technology that allows radio wave interference from a local wireless communication system to another communication system to be reduced.

Means for Solving the Problem

A local wireless communication system according to an aspect of the present invention forms a wireless communication environment in a licensed bandwidth. The system includes: a base station configured to emit radio waves to form a wireless communication environment in a predetermined area; a plurality of sensors disposed along an edge of the predetermined area; and a control apparatus communicable with the base station. Each of the sensors includes a measurement unit configured to measure a radio field intensity of a radio wave emitted from the base station, a feedback signal generation unit configured to generate a feedback signal including the measured radio field intensity, and a transmission unit configured to transmit the feedback signal to the base station. The base station includes an emitting unit configured to emit radio waves, a transmission power control unit configured to control transmission powers of the radio waves, a reception unit configured to receive a feedback signal from the base station, and a notification unit configured to notify the control apparatus of the radio field intensity included in the received feedback signal. The control apparatus includes a calculation unit configured to calculate information for controlling the transmission powers and supplies the information to the transmission power control unit to control the notified radio field intensity.

Effects of the Invention

According to an aspect of the present invention, it is possible to provide a technology that allows radio wave interference from a local wireless communication system to another communication system to be reduced.

DESCRIPTION OF EMBODIMENTS

Hereinafter, embodiments of the present invention will be described with reference to the drawings.

Embodiment

Configuration
(1) Overview

Figure 1:
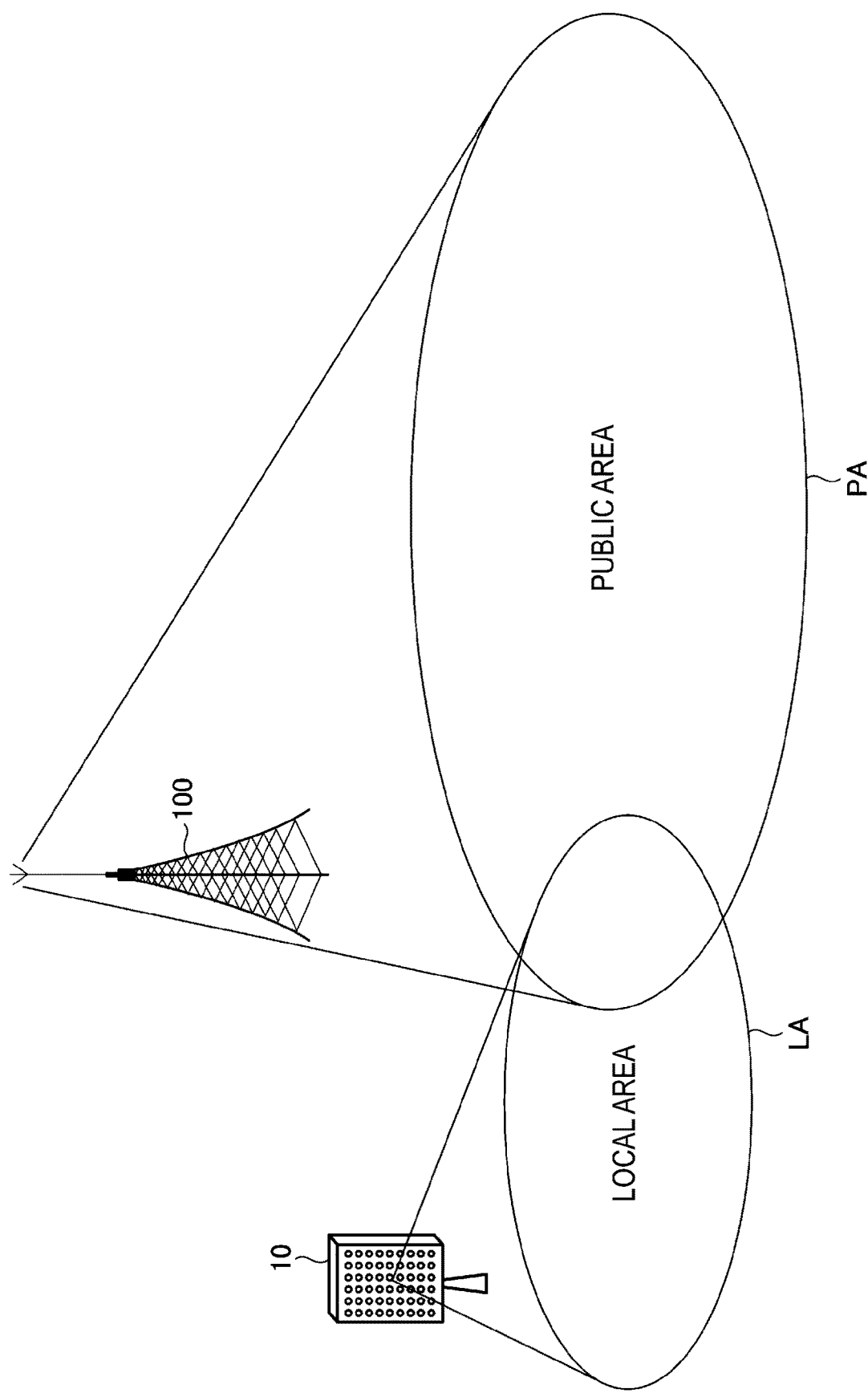
FIG. 1 is a diagram for describing a local wireless communication system according to an embodiment of the present invention.

FIG. 1 is a diagram for describing a local wireless communication system according to an embodiment of the present invention. A public base station 100 belonging to a public network forms a public area PA. A wireless terminal located in the public area PA can communicate with another party connected to the public network via access to the public base station 100.

On the other hand, for example, in a premise under the local wireless communication system, a local area LA is formed by a local base station (hereinafter abbreviated as a base station) 10. The local wireless communication system forms a wireless communication environment in the local area LA by radio waves in a bandwidth licensed in advance. The local area LA may partially or wholly overlap with the public area PA.

(2) Multibeam

Figure 2:
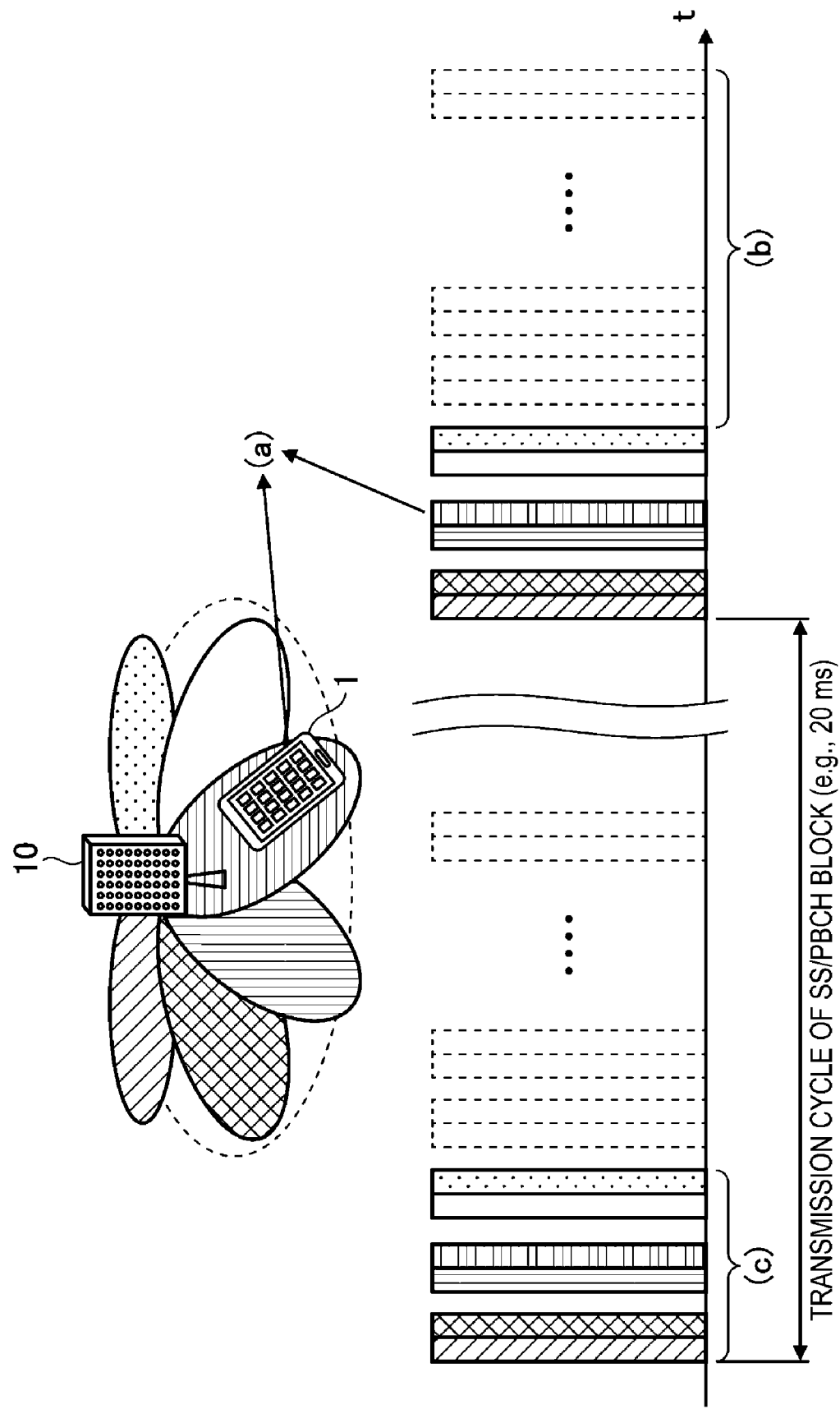
FIG. 2 is a diagram for describing a control method of multibeam that is examined in 5G.

FIG. 2 is a diagram for describing a control method of multibeam that is examined in the 5G. Details of the control method are disclosed in NPL 1. In standardized 5G new radio (NR), the base station 10 transmits SS/PBCH blocks of beams temporally exclusively and periodically. The SS/PBCH blocks of the beams transmitted from the base station 10 are basically transmitted at an identical transmission output. Note that hatchings in FIG. 2 are associated with the profiles and transmission time slots of individual beams.

A wireless terminal 1 detects frame slot timing from an identifier of an SS/PBCH block (a). When detecting a beam having a good reception quality, the wireless terminal 1 transmits a random access signal (PRACH) using a resource corresponding to the beam. In a procedure of a 3GPP (trade name)-standardized random access or the like, the wireless terminal 1 determines a transmission output that can reach the base station 10 and is as small as possible while gradually increasing the transmission output.

An unused SS/PBCH block candidate resource may be used for data communication or the like (b). A transmission cycle of the SS/PBCH block is 20 milliseconds (ms), the SS/PBCH block is associated with each beam, and thus there are a plurality of SS/PBCH blocks corresponding to the number of beams (c).

(3) System

Figure 3:
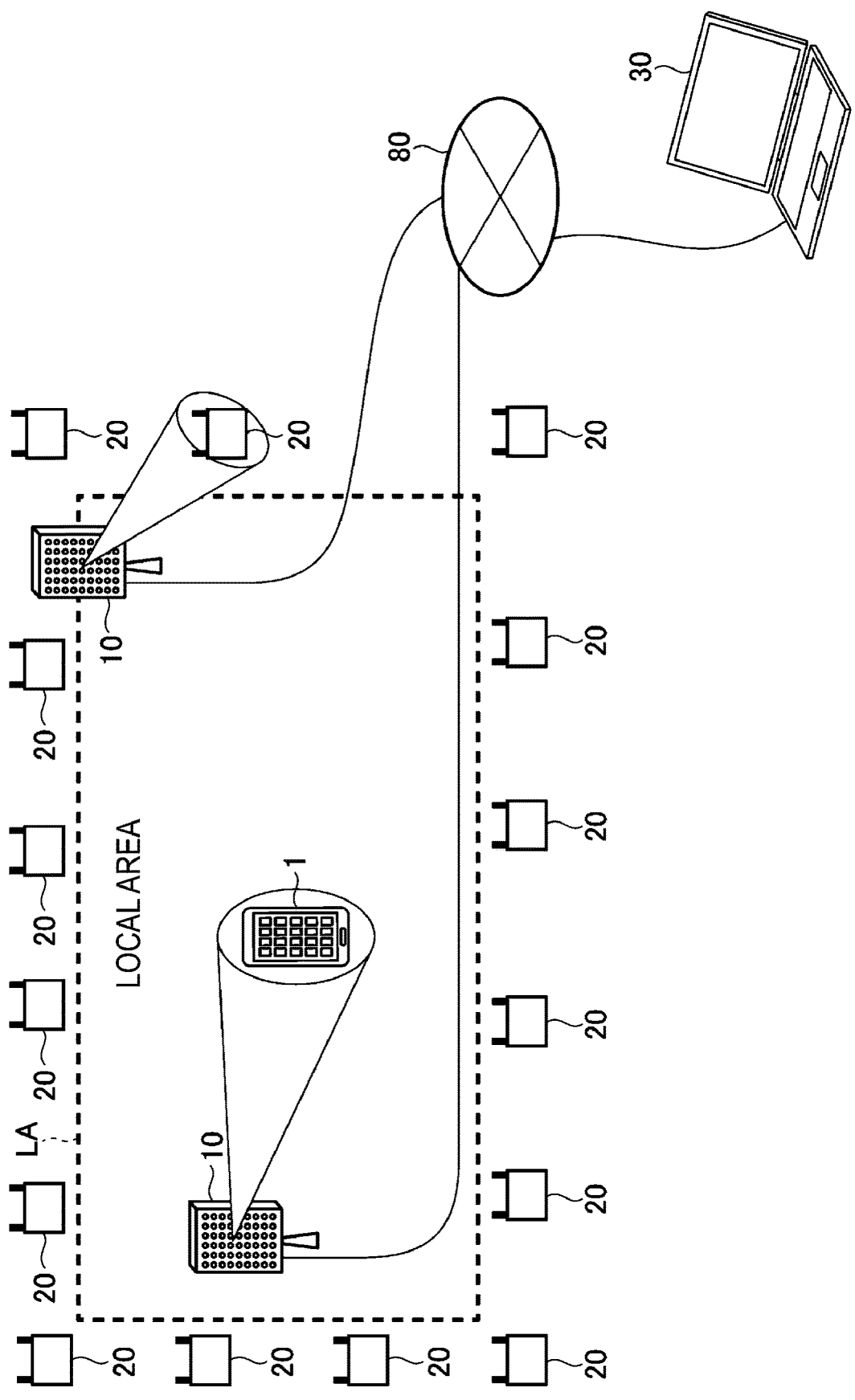
FIG. 3 is a diagram illustrating an example of the local wireless communication system according to the embodiment of the present invention.

FIG. 3 is a system diagram illustrating an example of the local wireless communication system according to the embodiment of the present invention. The system includes a base station 10, sensors 20, and a control apparatus 30. There may be a plurality of base stations 10. The base stations 10 each emit radio waves by multibeam, and deploy the local area LA.

The wireless terminal 1 is allowed to move within the local area LA. In other words, the local area LA is a "licensed moving range". The wireless terminal 1 located in the local area LA captures any of the beams emitted from the base stations 10, and acquires a wireless communication channel via a predetermined sequence. The base station 10 that has received a channel connection request from the wireless terminal 1 forms a communication link between the base station 10 and the wireless terminal 1.

A plurality of sensors 20 are disposed along edges of the local area LA. Each sensor 20 is capable of communicating with any one of the base stations 10. In the embodiment, it is assumed that each sensor 20 is equipped with a wireless communication function similar to that of the wireless terminal 1 and communicates with the base station 10 via a wireless channel.

The base station 10 is communicably connected to the control apparatus 30 via a network 80. The network 80 is preferably a wired network such as a local area network (LAN) in order to prevent unnecessary radio wave leakage.

Figure 4:
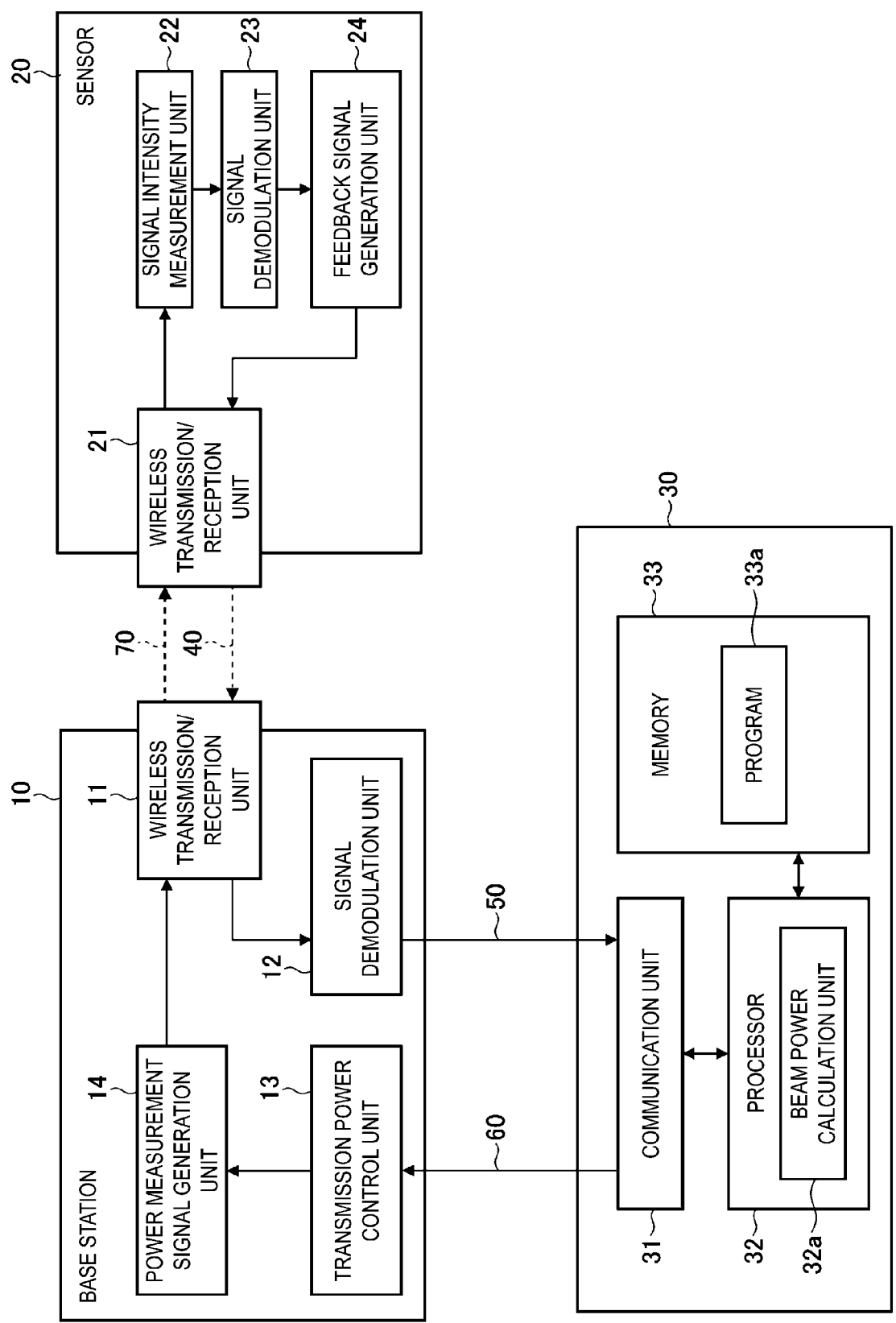
FIG. 4 is a functional block diagram illustrating an exemplary configuration of a base station 10, a sensor 20, and a control apparatus 30.

FIG. 4 is a functional block diagram illustrating an exemplary configuration of the base station 10, the sensor 20, and the control apparatus 30.

The sensor 20 includes a wireless transmission/reception unit 21, a signal intensity measurement unit 22, a signal demodulation unit 23, and a feedback signal generation unit 24.

The wireless transmission/reception unit 21 communicates with the base station 10 via a wireless channel. The wireless transmission/reception unit 21 transmits a feedback signal 40 to the base station 10 (or the control apparatus 30) using, for example, a user data region of a channel allocated from the base station 10, or a control message. In addition, a power measurement signal 70 transmitted from the base station 10 is received by the sensor 20. Note that for selection of a base station to which the sensor 20 is connected and a method for selecting a beam, a sequence conforming to the 3GPP (trade name) standard can be used, for example.

The signal intensity measurement unit 22 measures a radio field intensity of a radio wave emitted from the base station 10 for each beam of the multibeam. For example, the signal intensity measurement unit 22 can measure a radio field intensity using a detected reception electric field intensity of the power measurement signal 70. Note that the SS/PBCH block or the like can be used as the power measurement signal 70.

The signal demodulation unit 23 receives and demodulates the power measurement signal 70 and decrypts information placed on the power measurement signal 70. The power measurement signal 70 includes, for example, an identifier of the base station 10 that has emitted the power measurement signal 70 and an identifier of the beam that emits the power measurement signal 70.

The feedback signal generation unit 24 generates a feedback signal including the radio field intensity measured by the signal intensity measurement unit 22. The feedback signal is transmitted (returned) to the base station 10 having the measured radio field intensity by the wireless transmission/reception unit 21 as the transmission unit (a feedback signal 40).

The base station 10 includes a wireless transmission/reception unit 11, a signal demodulation unit 12, a transmission power control unit 13, and a power measurement signal generation unit 14.

The wireless transmission/reception unit 11 as the emitting unit emits radio waves in the licensed bandwidth and deploys the local area LA. The wireless transmission/reception unit 11 forms a plurality of beams (multibeam) oriented in different directions in a time division manner, and emits a radio wave for each beam.

The signal demodulation unit 12 receives/demodulates the feedback signal 40 from the sensor 20 and decrypts the information placed on the feedback signal 40. The feedback signal 40 includes, in addition to a radio field intensity from the base station 10 measured by the sensor 20, an identifier of the base station 10 having the radio field intensity that has been measured, and an identifier of a beam having the radio field intensity that has been measured. The signal demodulation unit 12 integrates these pieces of information with another piece of information and notifies the control apparatus 30 of the integrated information as a feedback signal 50.

The transmission power control unit 13 controls transmission powers of radio waves emitted from the wireless transmission/reception unit 11 for each beam based on the control parameter 60 provided from the control apparatus 30.

The power measurement signal generation unit 14 generates a power measurement signal 70 to be emitted from the wireless transmission/reception unit 11. The power measurement signal 70 is repeatedly emitted from the base station 10 at the time of activating or resetting the system and received at the sensor 20.

Integration of Information

Here, information to be integrated into the feedback signal 50 will be described. An ingenuity such as making a notification of only the largest reception power for an identical beam from collected feedback data allows an amount of communication to be reduced. That is, integrating information as indicated in the following (1), (2), or (3) to the feedback signal 50 in a stage before being given to the control apparatus 30 allows the amount of communication to be reduced.

(1) An average value of quality indicators each uniquely associated with a base station and a beam number having a radio field intensity that has been measured.
(2) A maximum value (or a minimum value) of quality indicators each uniquely associated with a base station and a beam number having a radio field intensity that has been measured.
(3) A maximum value (or a minimum value or an average value) of quality indicators from a wireless terminal 1 (and a sensor) connected to a base station and a beam number having a radio field intensity that has been measured.

As the quality information, any one (ones) of SSS-RSRP, SSS-RSRQ, SSS-SIR, SSS-RSSI, DMRS-RSRP, DMRS-SIR, and CQI may be used.

The sensor 20 and the wireless terminal 1 notify the base station 10 and the control apparatus 30 of the quality information for each combination of a Cell_ID and a beam ID. The base station 10 and the control apparatus 30 use the lowest quality value to perform transmission power control on the sensor 20 that selects the Cell_ID and the beam ID.

To integrate the information into the feedback signal 50, an integration processing unit for integrating data is provided, for example, in the signal demodulation unit 12 of the base station 10, or a subsequent stage thereof.

The control apparatus 30 is, for example, a personal computer or a server computer. The control apparatus 30 includes a communication unit 31 that communicates with the base station 10, a processor 32 such as a central processing unit (CPU), and a memory 33.

The memory 33 is a random access memory (RAM), for example, and stores a program 33a for implementing a function of the control apparatus 30 according to the embodiment. The program 33a is loaded from a storage medium (block device) such as a hard disk drive (HDD) or a solid state drive (SSD) to a storage region of the memory 33, for example. A program such as an operating system (OS) or a device driver is also stored in the storage medium.

Note that the storage medium may be constituted by combining the HDD or the SSD with a read only memory (ROM).

The processor 32 includes a beam power calculation unit 32a as a processing function according to the embodiment of the present invention. The beam power calculation unit 32a is implemented by the processor 32 executing the program 33a of the memory 33. In other words, the control apparatus 30 of the present invention can be also implemented by a computer and a program. The control apparatus 30 can provide a program via a network, in addition to recording a program in the storage medium.

The beam power calculation unit 32a acquires, from all the sensors 20, radio field intensities measured over all beams via the feedback signal 50. Then, the beam power calculation unit 32a calculates information (control parameter 60) for controlling a transmit power for each beam based on the acquired information (radio wave intensity for each beam measured by the corresponding sensor 20 in a sensor-by-sensor manner). In other words, the beam power calculation unit 32a calculates the control parameter 60 for suppressing the radio field intensity notified of from the sensor 20 to a prescribed threshold or less, and supplies the calculated control parameter 60 to the transmission power control unit 13 of the base station 10. Next, an operation in the above-described configuration will be described.

Operation

Figure 5:
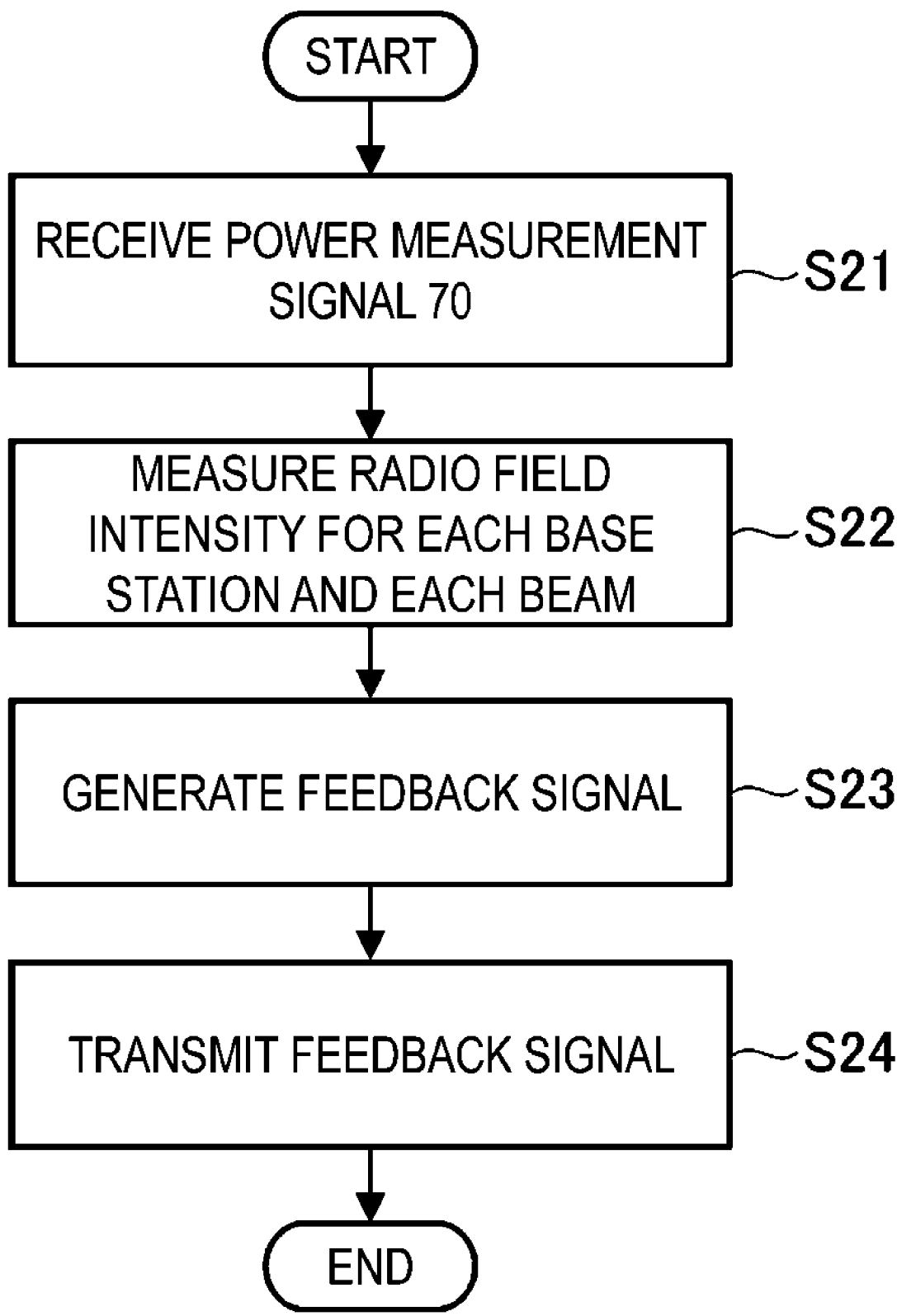
FIG. 5 is a flowchart illustrating an example of a processing procedure performed by the sensor 20.

FIG. 5 is a flowchart illustrating an example of a processing procedure of the sensor 20. The sensor 20 receives the power measurement signal 70 transmitted from the base station 10 (step S21). At the time, the sensor 20 may receive a positioning signal such as a global positioning system (GPS) signal. It is possible to calculate a distance to the local area LA by positioning with the GPS signal. The sensor 20 performs transmission beam forming control toward the inside of the premise of the local area LA for a radio wave transmitted by the sensor 20 itself based on the positional information (or a difference therefrom).

Next, the sensor 20 measures a received radio field intensity for each base station 10 and for each beam (step S22). Next, the sensor 20 generates a feedback signal including the measured radio field intensity (step S23) and transmits the generated feedback signal to the base station 10 (step S24).

Figure 6:
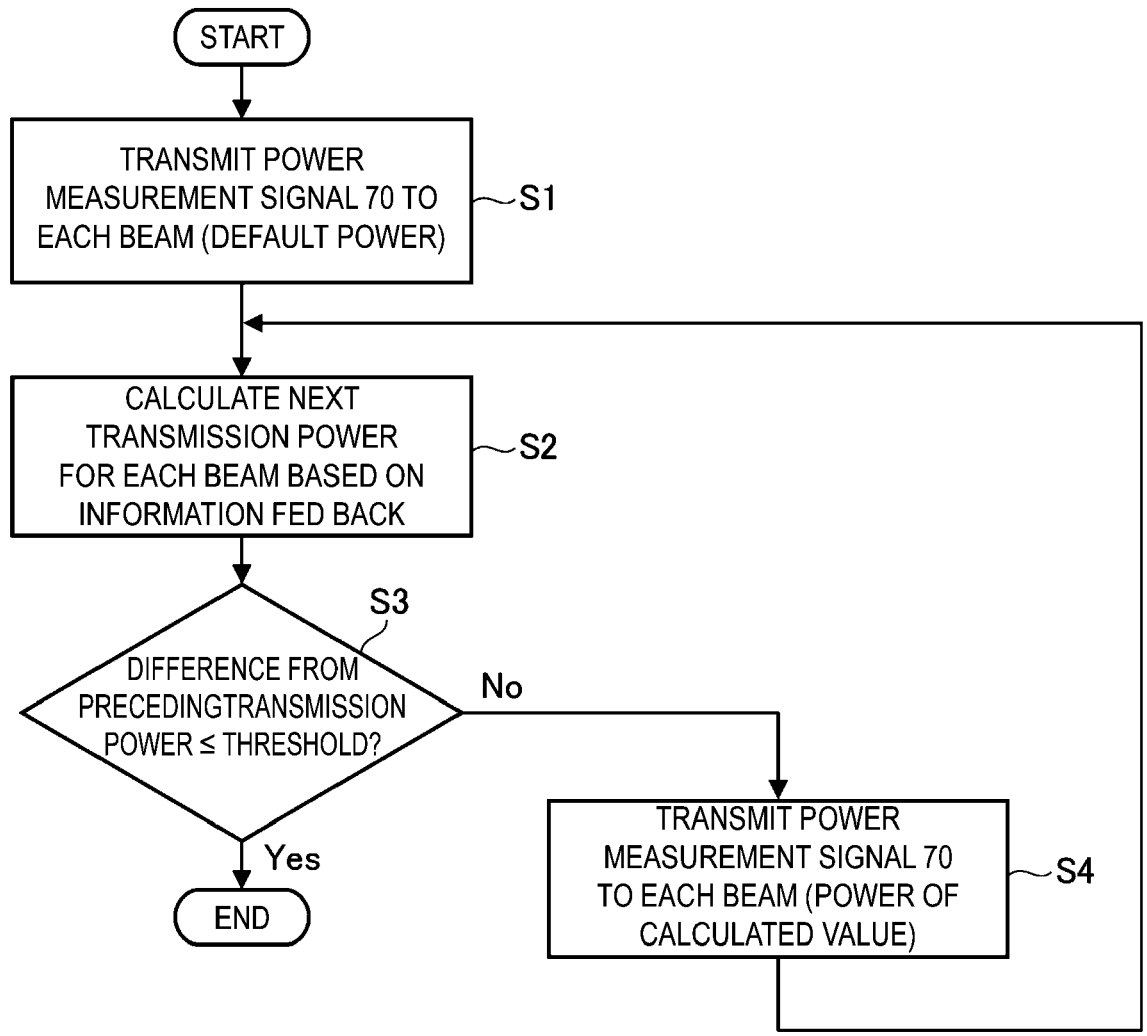
FIG. 6 is a flowchart illustrating an example of a processing procedure performed by the base station 10 and the control apparatus 30.

FIG. 6 is a flowchart illustrating an example of a processing procedure of the base station 10 and the control apparatus 30. The processing procedure illustrated in this flowchart is executed at the time of, for example, initial startup of the system. Through this procedure, a transmission power for each beam in the operation phase is individually determined.

The base station 10 transmits the power measurement signal 70 to each beam by control of the control apparatus 30 (step S1). The transmission power is here assumed to be a default value set in advance. Next, the control apparatus 30 calculates a transmission power at the next transmission for each beam based on various pieces of information including radio field intensity fed back from the corresponding sensor 20 (step S2).

Next, the control apparatus 30 compares the value of the transmission power calculated in the preceding processing with the latest value of the transmission power calculated in step S2 (step S3), and when the difference therebetween is a threshold or less (Yes), the control apparatus 30 terminates the processing by determining that the transmission power has converged on a constant value. On the other hand, in step S3, when the difference between the preceding value and the latest value is greater than the threshold (No), the control apparatus 30 transmits the power measurement signal 70 to each beam with the latest transmission power calculated in step S2 (step S4).

When a loop from steps S2 to S4 is repeated to some degree, the transmission power becomes a different value for each beam and converges on a constant value. In other words, the beam power calculation unit 32a performs feedback control on the transmission power of the power measurement signal 70 to converge the radio field intensity of the power measurement signal 70 on a predetermined threshold or less.

The sensor 20 and the wireless terminal 1 notify the base station 10 and the control apparatus 30 of the quality information of the power measurement signal 70 for each combination of the Cell_ID and the beam ID. The base station 10 and the control apparatus 30 use the lowest quality value to perform transmission power control on the sensor 20 that selects the Cell_ID and the beam ID.

For the quality information, it is preferable to set a target value Q_T in advance. A control amount of the transmission power (a difference amount ΔP from the current transmission power) is determined based on a difference E=Q_T−Q_P between the target value Q_T and the minimum value Q_P fed back (processing of step S3). The difference amount ΔP is determined by techniques of (21) to (23), for example.

(21) Fuzzy control: ΔP=a×E+b (a, b each are a coefficient. a is usually a positive constant. b is usually zero)
(22) PID control
(23) Control by machine learning It is also possible to perform control by using the technique (22) or (23) in such a manner that a leakage power does not exceed (is little likely to exceed) the threshold. The technique (22) can be implemented by parameter setting, for example. The technique (23) can be implemented by setting an evaluation (score) using the leakage power exceeding the threshold to a negative infinity (or a negative large value). According to the technique (23), the leakage power at the time of power measurement and determination can be set to a predetermined value or less.

Here, the transmission power of the power measurement signal 70 is gradually increased from the lowest power value. Two patterns of the following (a) and (b) are considered.

[Pattern (a)] A default transmission power value is set to the lowest value that can be set. The pattern (a) may include the following procedures (11) to (14).

(11) Increase the transmission power for each beam step by step.
(12) Increase the transmission power to the minimum necessary power with which the number of communicable sensors 20 (or wireless terminals 1) does not change.
(13) After the sensor 20 selects a beam with the best quality in the processing up to (12), a procedure may be added to perform control only on the beam.
(14) A procedure of periodically resetting may be further added to the processing up to (12) or (13). Then, the procedures illustrated in the flowchart of FIG. 6 are repeated, so that it is possible to add a function that follows a change in environment.

According to the pattern (a), it is possible to simply make the leakage power at the time of power measurement and determination a desired value or less.

[Pattern (b)] A default transmission power (P_def [dBm]) may be calculated based on a distance to the closest (or farthest) area boundary (d_min).

For example, the default transmission power (P_def) can be calculated using the following Equation (1).

$$P\_def = \alpha \times d\_min + \beta \quad (1)$$

According to Equation (1), it is possible to calculate the default transmission power (P_def) most simply. Here, α and β each are a predetermined coefficient.

Alternatively, the default transmission power (P_def) can be calculated by the following Equation (2).

$$P\_def = \alpha \times \log 10(d\_min) + \beta \quad (2)$$

According to ITU-R P.1411-10, Models for propagation over roof-tops/Site-specific/Sub-urban (Reference Literature), it is assumed that there is a correlation between the transmission power and the log 10 of the distance. Equation (2) is based on such a finding.

The distance to the area boundary may be calculated at the time of designing a station and manually entered as a set value. Alternatively, the sensor 20 or the wireless terminal 1 may perform positioning based on a GPS signal.

In other words, the pattern (b) is a technique for adjusting the transmission power of the power measurement signal 70 by a control amount in accordance with the feedback information (received power, Cell_ID, Beam identifier, time point, positional information, sensor identifier, etc.) from a predetermined value that is not the smallest. When the default value is determined from the minimum distance to the premise boundary of the area, it is possible to make the power measurement/determination process of the base station 10 faster.

Effects

As described in detail above, in the embodiment, in a local wireless communication system such as the local 5G, a plurality of sensors 20 are disposed on an outer periphery of an allowed area (terminal moving range), and a received power of a signal transmitted from the base station 10 is measured by each of the sensors 20. Each sensor 20 notifies the control apparatus 30 of a measurement result of the received power. Then, the control apparatus 30 controls a transmission power of the base station 10 to cause the received power notified of from the sensor 20 to be a predetermined threshold or less.

As a result, a radio wave from the base station 10 that leaks outside the local area LA can be kept at a reference value or less. Accordingly, it is possible to avoid causing interference on another system. That is, it is possible to minimize unnecessary radio waves that leak out of a licensed range, reduce a required separation distance from another system, and enhance radio wave sharing efficiency.

Other Embodiments (1) In the embodiment, the control apparatus 30 is assumed to be disposed near the base station 10 via the LAN or the like. Instead of this, the public network may be utilized as the network 80 and the control apparatus 30 may be disposed remotely from the base station 10. Alternatively, the functions of the control apparatus 30 may be virtualized and implemented as a cloud service.

(2) In the embodiment, it has been described that the wired network 80 is preferably used. Instead of this, the base station 10 may be connected to the control apparatus 30 wirelessly (such as IAB WiGig). However, when the same frequency bandwidth as in the area is used, beam power control is preferably performed based on a scheme similar to that of the processing procedure described in FIG. 5 and FIG. 6.

(3) In the embodiment, it has been described that the feedback signal 40 is transmitted from the sensor 20 to the base station 10 via a radio resource of the base station 10. Instead of this, the sensor 20 may be wired to the base station 10 so that the base station 10 is notified of the feedback signal over a wired line. In this way, consumption of radio resources can be reduced, and thus it is possible to increase the number of wireless terminals 1 capable of being housed.

(4) FIG. 3 illustrates that the sensor 20 is disposed outside the local area LA, but instead of this, the sensor 20 may be disposed at an area edge (i.e., outside and inside along the edge of the area). In this case, the system is operated with a minimum power/beam that is capable of ensuring a reception quality within the area. As a result, it is possible to ensure a communication quality in the area and minimize a leakage power.

(5) A combination of a selected cell, a selected beam, and a selected power (transmission power) for each section in the area may be optimized. For example, a quality and/or a leakage power within the area may be used as an indicator of optimization. This makes it possible to perform setting processing of the transmission power for each beam of the base station 10 with high efficiency.

(6) In the embodiment, it has been described that the beam power calculation unit 32a calculates the control parameter 60 for suppressing the radio field intensity notified of from the sensor 20 to a prescribed threshold or less. This is not a limitation, and in short, information (control parameter 60) for controlling the transmission power only needs to be calculated and given to the transmission power control unit 13 to control the notified radio field intensity. This also makes it possible to put the intensity of the leakage radio wave under control and to prevent the radio waves from the base station from being emitted to the outside of the local area LA in a disordered manner. In other words, as long as it is possible to control a radio field intensity of a leaked radio wave and control the intensity near the prescribed value, the object is achieved.

(7) In addition, the configurations of the control apparatus, the sensor, and the base station, the processing procedures and the processing contents, the radio resources used, and the like can be variously modified within a range not deviating from the gist of the present invention to be implemented.

In other words, the present invention is not limited to those described in the foregoing embodiments, and the components may be modified within the range not deviating from the gist of the present invention. Furthermore, various inventions can be formed by appropriately combining a plurality of constituent components disclosed in the above embodiments. For example, several constituent components may be omitted from all the components illustrated in the embodiments. Furthermore, components in different embodiments may be appropriately combined with each other.

REFERENCE SIGNS LIST

1 Wireless terminal
10 Base station
11 Wireless transmission/reception unit
12 Signal demodulation unit
13 Transmission power control unit
14 Power measurement signal generation unit
20 Sensor
21 Wireless transmission/reception unit
22 Signal intensity measurement unit
23 Signal demodulation unit
24 Feedback signal generation unit
30 Control apparatus
31 Communication unit
32 Processor
32a Beam power calculation unit
33 Memory
33a Program
40 Feedback signal
50 Feedback signal
60 Control parameter
70 Power measurement signal
80 Network
100 Public base station

The invention claimed is:

1. A local wireless communication system forming a wireless communication environment in a licensed bandwidth, the local wireless communication system comprising:
a base station configured to emit radio waves to form the wireless communication environment in a predetermined area;
a plurality of sensors is disposed along an edge of the predetermined area;
a plurality of beams corresponding to the plurality of sensors, wherein the plurality of beams are formed in a time division manner; and
a control apparatus communicable with the base station;
wherein each of the plurality of sensors and plurality of beams is
configured to measure a radio field intensity of the radio wave emitted from the base station,
generate a feedback signal including the measured radio field intensity,
transmit the feedback signal to the base station;
wherein the base station is
configured to control a transmission power of the radio waves,
receive the feedback signal from the plurality of sensors and the plurality of beams,
notify the control apparatus of the radio field intensity included in the received feedback signal;
control the transmission power of the radio wave for each of the plurality of beams, wherein the transmission power is a control parameter for controlling the power of each beam in the plurality of beams;
calculate information for controlling the transmission power for each of the plurality of beams according to the radio field intensity; and
generate and transmit a power measurement signal;
wherein the control apparatus is
configured to
calculate a next transmission power for each beam of the plurality of beams according to the radio field intensity measured by the plurality of sensors;
determine a difference between the transmission power and the next transmission power;
terminate transmission in response to the difference being less than or equal to a threshold value;
transmit the power measurement value of each beam of the plurality of beams in response to the difference being greater than the threshold value, wherein the power measurement signal is the next transmission power;

update the transmission power according to the next transmission power; and provide the transmission power to the base station to control the notified radio field intensity.

2. The local wireless communication system according to claim 1, wherein the feedback signal includes an identifier of a base station having the radio field intensity that has been measured and an identifier of a beam having the radio field intensity that has been measured.

3. The local wireless communication system according to claim 1, wherein the power measurement signal includes an identifier of a base station emitting the power measurement signal and an identifier of a beam emitting the power measurement signal.

4. A radio field intensity control method for controlling radio wave intensities of radio waves emitted from a base station, the base station emitting the radio waves in a licensed bandwidth to form a wireless communication environment in a predetermined area, a plurality of sensors being disposed along an edge of the predetermined area, a control apparatus communicable with the base station, a plurality of beams in a time division manner, the radio field intensity control method comprising:

measuring, by each of the plurality of sensors and the plurality of beams, the radio field intensity of radio waves emitted from the base station;

feeding back, by each of the plurality of sensors and the plurality of beams, the measured radio field intensities to the base station;

controlling, by the base station, transmission powers of the radio waves for each of the plurality of beams;

calculate information for controlling the transmission power for each of the plurality of beams according to the radio field intensity;

generate and transmit a power measurement signal;

calculate, by the control apparatus, a next transmission power for each beam of the plurality of beams according to the radio field intensity measured by the plurality of sensors;

determine, by the control apparatus, a difference between the transmission power and the next transmission power;

terminate, by the control apparatus, transmission in response to the difference being less than or equal to the prescribed threshold;

transmit, by the control apparatus, the power measurement signal to each beam of the plurality of beams in response to the difference being greater than the threshold value, wherein the power measurement signal is the next transmission power;

update, by the control apparatus, the transmission power according to the next transmission power; and provide the transmission power to the base station to control the notified radio field intensity.

5. A control apparatus applicable to a local wireless communication system, the local wireless communication system including a base station configured to emit radio waves to form a wireless communication environment in a predetermined area, a plurality of sensors disposed along an edge of the predetermined area, and a plurality of beams in a time division manner, the control apparatus comprising:

a memory configured to store a program; and a processor configured to execute the program, wherein the processor includes a calculation function for calculating transmission powers of the radio waves emitted from the base station to control radio field intensities of the radio waves emitted from the base station measured by the plurality of sensors, and calculating a next transmission for each beam of the plurality of beams according to the radio field intensities measured by the plurality of sensors;

a determining function for determining a difference between the transmission power and the next transmission power, terminating transmission in response to the difference being less than or equal to a threshold value, and transmitting a power measurement signal to each beam of the plurality of beams in response to the difference being greater than the threshold value, wherein the power measurement is the next transmission power;

an updating function of updating the transmission power according to the next transmission power.

6. A non-transitory computer-readable medium having computer-executable instructions that, upon execution of the instructions by a processor of a computer, cause the computer to function as the control apparatus described in claim 5.

* * * * *